Figures 1, 2:
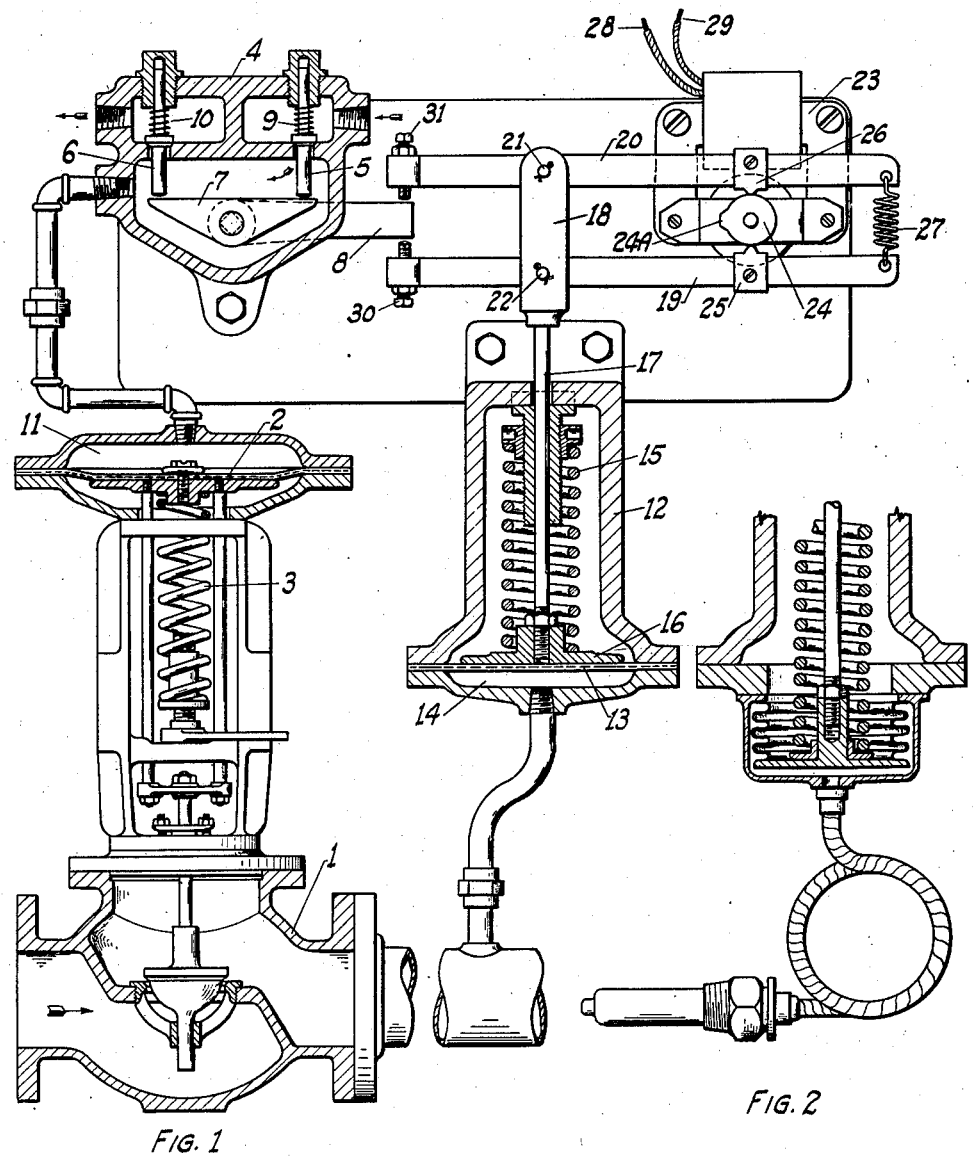

Patented Apr. 12, 1938

2,113,943

UNITED STATES PATENT OFFICE 2,113,943

CONTROL SYSTEM

James Lewis Kimball, Danvers, Mass., assignor to Ruggles-Klingemann Mfg. Co., Salem, Mass.

Application February 18, 1936, Serial No. 64,539

5 Claims. (Cl. 50—10)

This invention relates to regulators for general use in fluid systems such as the control of pressure, temperature, or other like physical conditions to maintain the same within definite predetermined limits.

The principal object of my invention is to provide a periodic actuation of the regulating means, the degree of said actuation varying with variations from normal in the condition of the system with a variable time delay between each period of operation whereby time-lag of the system may be compensated for and a condition of over-correction and consequent hunting action avoided.

To accomplish the objects of my invention I provide a continuous operating motor driven cam cooperating with a device which is sensitive to variations in the condition of the system; the arrangement being such that the degree of operation is a variable conforming to the degree of departure from a mean average value of the condition of the system and adapted to effect variable periods of rest to allow the time lag of the system to be taken up before proceeding to a further degree of operation.

In regulators of the class disclosed, which do not embody the novel features of my invention and where there is a time lag in the response of the system to actuations by the control mechanism, the condition of the system will fluctuate to a greater or less degree depending on the extent of the time lag because the control mechanism will over correct and operate with a continuous hunting action.

In the operation of regulators of this class, which include the novel features of my invention, the time delay between each period of actuation will be such as to allow the time lag of the system to be taken up before proceeding to a further actuation and therefore the time lag of the system is compensated for and an unstable operation of the control mechanism is avoided.

My invention will be best understood by reference to the accompanying drawing in which Fig. 1 is a diagrammatic illustration of the essential elements which go to make up a complete control system of the relay type. Fig. 2 shows a thermostatic element which may be substituted for the pressure sensitive element when the mechanism is to be employed for temperature control instead of pressure.

Referring to Fig. 1 a pressure control valve 1 having flexible diaphragm 2 and diaphragm pressure counteracting spring 3 is suitable for carrying out the objects of my invention. A pilot valve 4 controls a source of pressure for operating valve 1. The pilot valve has admission valve 5 and exhaust valve 6. A rocker arm 7 is actuated by lever 8 adapted to actuate either valve 5 or 6. Springs 9 and 10 normally hold these valves in a closed position. The raising of lever 8 opens valve 5 admitting pressure to diaphragm chamber 11 and closing valve 1. Likewise a downward movement of lever 8 will first close valve 5 and then open valve 6 exhausting pressure from chamber 11 and allowing spring 3 to open valve 1. A pressure sensitive device 12 has flexible diaphragm 13 and pressure chamber 14 which chamber is connected to the pressure system which it is required to control. The pressure on diaphragm 13 is counteracted by the spring 15. This flexible diaphragm 13 has a pressure plate 16 and rod 17 which connects the diaphragm 13 with a link 18 so as to operate the same. Link 18 supports two horizontal floating levers 19 and 20 which are pivoted on link 18 at points 21 and 22. A continuous operating motor 23 of the clock type having gear reduction to 1 R. P. M. is usually found suitable for the purposes of this invention, altho with excessive time lag a greater speed reduction is often required. This motor 23 operates cam 24 to alternately rock floating levers 19 and 20 about pivot points 21 and 22. Abutments 25 and 26 are connected to levers 19 and 20 and are held in contact with cam 24 by spring 27.

In operation, motor leads 28 and 29 are connected to a suitable source of electric energy and cam 24 starts turning. Now assuming that the pressure of the system is at a mean average value, then the tappet screws 30 and 31 will be adjusted to barely clear arm 8 when the projecting part 24—A of the cam 24 passes over abutment 25 or 26.

Now assuming there was an increase in the pressure in the system which would cause diaphragm 13 to be forced upward against the tension of spring 15 which would raise pivot points 21 and 22, then as cam projection 24—A passed over abutment 25 tappet screw 30 would contact with lever 8 momentarily opening valve 5 and admitting pressure to chamber 11 and slightly closing valve 1.

On the other hand, should there be a slight drop in pressure then as cam passed over abutment 26 lever 20 would in like manner be rocked on pivot point 21 and tappet screw 31 would contact with the upper side of lever 8 to open exhaust valve 6 and discharge a slight amount of pressure from chamber 11 which would allow spring 3 to slightly open valve 1 and supply the deficiency in pressure. It will be understood that if there is a larger variation from normal in the system, then either valve 5 or 6, depending on whether the variation is above or below normal, will be opened wider and for a longer period of time thus correcting the larger variations from normal, and furthermore if there is an extreme variation from normal then either abutment 25 or 26 as the case may be will be forced away from contact with cam 24 against the tension of spring 27 and one of the valves 5 or 6 will be held open continuously until normal pressure is restored.

While I have described my invention in relation to the control of steam pressure, it should be understood that it is of equal advantage in the control of temperature and the only change required would be to substitute the thermostatic element of Fig. 2 in place of diaphragm 13. The application to liquid level control through float operation or any control means of compensating for time lag and thereby preventing over correction is within the scope of my invention. I, therefore, wish to have it understood that I do not desire to be restricted to the exact details of construction and arrangement of the parts shown and described, but that only such limitations shall be imposed as are indicated by the appended claims.

I claim:—

1. In a control system for the regulation of a condition to maintain the same within a predetermined value, comprising means for controlling said condition, fluid pressure means for actuating the controlling means, a valve for controlling the fluid pressure means, an element sensitive to variation from normal in said condition, a floating member adapted to be operated by the variation in said sensitive element, and electric operated means including a cam in engagement with and adapted to rock said floating member to cause a periodic actuation of said valve when said condition acting on the sensitive element varies from its normal value and a uniform period of rest between each period of operation.

2. In a control valve comprising a valve casing having admission and exhaust valves, said valves having a neutral position in which both valves are closed, means for alternately opening either one or the other of said valves, a floating member for operating said means, a pressure sensitive device for actuating the floating member, and electric operated means including a cam in engagement with and adapted to rock said floating member to cause a periodic actuation of either one or the other of said valves depending on the value of the pressure on the pressure sensitive device and having a uniform non-responsive period between each period of operation.

3. In a pressure system, a valve for controlling the pressure in the system, fluid pressure means for actuating the valve, a pilot valve for controlling the fluid pressure means, a floating member for operating the pilot valve, a pressure sensitive device for actuating the floating member and electric operated means including a cam in engagement with said floating member co-acting with the pressure sensitive device adapted to rock said floating member to cause a periodic actuating of said pilot valve when the pressure acting on the pressure sensitive device varies from its normal value.

4. In a control system for the regulation of a condition to maintain the same within predetermined limits, comprising means for controlling said condition, fluid pressure motive means for actuating the controlling means, a control valve for controlling a source of pressure to operate the fluid pressure motive means, a floating member for operating the control valve, a device sensitive to the condition to be controlled, pivoted to and adapted to position the floating member, and a continuous operating cam adapted to rock said floating member on said pivot to cause actuation of said control valve when said condition departs from said predetermined limits.

5. In a control system for the regulation of a condition to maintain the same within predetermined limits, comprising means for controlling said condition, fluid pressure motive means for actuating the controlling means, a control valve for controlling a source of pressure to operate the fluid pressure motive means, a floating member for operating the control valve, a device sensitive to variations in the condition to be controlled, pivoted to and adapted to position the floating member and a continuous operating cam adapted to rock said floating member about said pivot and thereby actuate said valve with cycling periods of operation varying in time and extent in accordance with variations in the positioning of said member.

JAMES LEWIS KIMBALL.